United States Patent [19]

Myhrvold et al.

[11] Patent Number: 5,539,471
[45] Date of Patent: Jul. 23, 1996

[54] SYSTEM AND METHOD FOR INSERTING AND RECOVERING AN ADD-ON DATA SIGNAL FOR TRANSMISSION WITH A VIDEO SIGNAL

[75] Inventors: Nathan P. Myhrvold, Bellevue; Gideon A. Yuval, Mercer Island; William E. Kim, Redmond, all of Wash.

[73] Assignee: Microsoft Corporation, Redmond, Wash.

[21] Appl. No.: 254,363

[22] Filed: May 3, 1994

[51] Int. Cl.$^6$ .................................................. H04N 7/08
[52] U.S. Cl. .................................... 348/473; 348/486
[58] Field of Search .......................... 348/473, 475, 348/486, 21, 471; H04N 7/08, 7/081

[56] References Cited

U.S. PATENT DOCUMENTS

| | | | |
|---|---|---|---|
| 3,084,329 | 4/1963 | Clay | 325/65 |
| 3,842,196 | 10/1974 | Loughlin | 358/12 |
| 4,660,072 | 4/1987 | Fukinuki | 358/12 |
| 4,686,705 | 8/1987 | Smith | 455/109 |
| 4,745,460 | 5/1988 | Fukinuki | 358/12 |
| 4,821,101 | 4/1989 | Short | 358/181 |
| 4,839,743 | 6/1989 | Best et al. | 358/310 |
| 4,847,690 | 7/1989 | Perkins | 358/143 |
| 4,849,817 | 7/1989 | Short | 358/142 |
| 4,855,827 | 8/1989 | Best | 358/143 |
| 4,884,139 | 11/1989 | Pommier | 348/21 |
| 4,885,631 | 12/1989 | Fukinuki et al. | 358/21 R |
| 4,943,848 | 7/1990 | Fukinuki | 358/12 |
| 4,945,225 | 7/1990 | Garngee et al. | 250/214 B |
| 4,945,402 | 7/1990 | Fukinuki | 358/12 |
| 4,955,072 | 9/1990 | Tomljenovic | 455/108 |
| 5,063,446 | 11/1991 | Gibson | 358/142 |
| 5,200,715 | 4/1993 | Gerdes et al. | 332/185 |
| 5,200,822 | 4/1993 | Bronfin et al. | 358/142 |
| 5,278,637 | 1/1994 | Naimpally | 348/473 |

FOREIGN PATENT DOCUMENTS

WO92/22984 12/1992 WIPO ................ H04N 7/08

OTHER PUBLICATIONS

C. Luebke, "New wave in data communications may start here," *The Business Journal*, Oct. 26, 1992.
"Now, Data Can Hitchhike On TV Signals," *Business Week*, Dec. 7, 1992.
"Mixed signals" *USA Today Money*, Jan. 13, 1993.
"New Transmission System Piggybacks Signals," *Interactive World*, Feb., 1993.
C. Jungo, "Transmitting hidden data in video signals," *Broadcast Engineering*, Feb., 1993.
"WavePhore Develops High Speed Data Modem for Television," *TV TechCheck*, Feb. 22, 1993.
"Modem Piggybacks TV Signal," EDP Weekly 34(13), Mar. 29, 1993.

(List continued on next page.)

*Primary Examiner*—Victor R. Kostak
*Attorney, Agent, or Firm*—Seed and Berry

[57] ABSTRACT

A system and method for inserting a data signal into a preexisting video signal in a transmitter so that the data signal is transmitted along with the video signal. The data signal is inserted into an unused portion of the video signal spectrum. The data signal is separated from the video signal in a receiver and may be used for any purpose, even purposes unrelated to the video signal. The data signal is filtered to create a filtered data signal having spectral characteristics that correspond to the unused portion of the video signal spectrum. The filtered signal modulates a carrier signal whose frequency is selected to permit direct insertion of the modulated filtered data signal into the video signal spectrum. In the receiver, the video signal is processed in a normal manner; and the data signal is undetected by normal television receivers. A signal separator separates the filtered data signal from the combined video signal, and an inverse filter recovers the original data signal. In one embodiment, a comb filter is used to generate the filtered data signal with 60 Hertz peaks. An inverse comb filter in the receiver recovers the original data signal. A recirculating buffer may also be used to generate the filtered data signal.

44 Claims, 7 Drawing Sheets

OTHER PUBLICATIONS

"WavePhore Enables Broadcasters to Participate In 'Information Superhighway'," Press release from WavePhore, Inc., Apr. 19, 1993.

"Technology Offers TV Broadcasters An Avenue Into Interactive Services," *Investor's Business Daily* 10(6), Apr. 19, 1993.

"New System Delivers Interactive Video, Data Services Through Existing TV Signals," *CE Network News*, Apr., 1993.

J. Wynn, "The Technology Boom Beckons Investors," *Today's Investor* 13(5), May, 1993.

5,539,471

1

SYSTEM AND METHOD FOR INSERTING AND RECOVERING AN ADD-ON DATA SIGNAL FOR TRANSMISSION WITH A VIDEO SIGNAL

TECHNICAL FIELD

The present invention relates generally to video signal processing and more specifically to a system and method for inserting data into a standard video signal.

BACKGROUND OF THE INVENTION

The use of television is commonplace in the United States and throughout the world. Nearly every home in the United States has at least one television set. Many homes have cable television, which couples a large number of television channels to the home through a single coaxial cable. Other homes and businesses may have satellite receivers that are capable of receiving television signals from a number of satellites in stationary orbit around the earth.

Television signals are defined by the National Television Standards Committee (NTSC). Each television signal comprises a video signal and an audio signal. The NTSC signal, which evolved when only black and white (B/W) television was available has a baseband bandwidth of approximately 4.7 megahertz (MHz). The NTSC signal is modulated to a predetermined carrier frequency. For example, VHF channel 2 has a carrier frequency of 55.25 MHz. A small spacing in the frequency spectrum between adjacent channels prevents interference between channels. The bandwidth of the modulated signal is approximately 6.0 MHz. Other transmission systems, such as cable broadcasting, may use different frequencies for the television channels.

When color television was introduced, it was important that the color signals be added in a manner that did not interfere with the normal operation of B/W television signals. This was accomplished by introducing a chrominance signal modulated at a frequency that causes the chrominance signal for each line of the television signal to have an inverted phase with respect to the prior line. There are an odd number of lines in each television frame, with the result being that the chrominance signal for any given line is inverted in alternating frames of the television signal. The phase inversion causes the chrominance signal to cancel out temporally over the time of one frame, and spatially in the vertical axis over the space of two lines. The cancellation prevents the chrominance signal from erroneously being interpreted as part of the luminance signal. This effect, combined with the known persistence of vision in humans causes the chrominance signal to effectively cancel out in a B/W television so that it causes no noticeable interference. The NTSC signal has a modulated chrominance signal that overlaps the luminance signal in a portion of the frequency spectrum where the overlap causes minimal interference.

The frequency spectrum of the NTSC signal is shown in FIG. 1A. As can be seen in FIG. 1A, the video signal comprises a luminance signal 2 and a chrominance signal 4. The luminance signal 2 provides the signal intensity for both B/W and color television signals. The luminance signal 2 has spectral peaks 6 every 15.75 kilohertz (kHz), which corresponds to the horizontal frequency in the television. The amplitude of the luminance spectral peaks 6 decreases up to 4.2 MHz. The video signal is suppressed above 4.2 MHz to permit the insertion of an audio signal 5 in the spectrum for the particular video channel. The audio signal 5 is modulated with a 4.5 MHz carrier.

2

The chrominance signal 4 is introduced beginning at about 2 MHz in the spectrum. The chrominance signal 4 has chrominance spectral peaks 8, which are also spaced 15.75 MHz apart in the frequency spectrum. The chrominance signal is modulated at a frequency of 3.579545 MHz (an odd multiple of half the line scan frequency) to cause the chrominance signal peaks to interlace with the luminance peaks, as shown in FIG. 1B, which illustrates a magnified portion of the spectrum of FIG. 1A.

As seen in FIG. 1B, the luminance spectral peaks 6 and the chrominance spectral peaks 8 are spaced apart by 7.875 kHz. Although FIG. 1B, shows the frequency spectrum with no overlap, there is some degree of overlap in these signals due to the non-periodicity of the signals with respect to the line scan frequency.

The NTSC signal has temporal characteristics as well as the frequency characteristics described above. A single video frame comprises 525 video lines that are displayed in two interlaced video fields. Each video field is displayed with a vertical display rate of approximately 60 Hz (59.94 Hz) so that a video frame (with two interlaced video fields) is displayed at a vertical display rate of approximately 30 Hz (29.97 Hz). As seen in FIG. 2, there are two luminance peaks L1 and L2, spaced apart in the frequency spectrum by 30 Hz. The chrominance signal 4 is inserted between alternating pairs of luminance peaks 6. If one selects an arbitrary luminance peak L1 as a reference luminance peak, it is readily seen that the chrominance signal 4 has a spectral peak C 15 Hz above the reference luminance line peak L1. A second luminance peak L2 is spaced 15 Hz above the chrominance peak C (and 30 Hz above the reference luminance peak L1). The luminance peak L1 appears again 60 Hz above the reference luminance peak L1. Thus, the pattern repeats every 60 Hz. It should be noted that there is no signal in the spectrum 45 Hz from the reference luminance peak L1. As described in the prior art, that spectral "hole" in the spectrum is currently unused, and could carry additional information. The frequency spectrum of the NTSC signal with additional information signal D added is shown in FIG. 3. Note that the additional information signal is added to an unused portion of the spectrum that, in an ideal case, will cause no interference with the normal video signal processing.

The use of this spectral hole is described in U.S. Pat. No. 4,660,072, which is incorporated herein by reference. The patent describes a technique for adding an additional luminance signal to a standard video signal by inserting the additional luminance signal into the unused portion of the spectrum. The system disclosed in the patent modulates a high frequency luminance signal with a 3.579545 MHz carrier that abruptly switches phase every field of the NTSC signal (60 Hz). The carrier signal is thus modulated by a 30 Hz square wave that has alternating phases of the carrier signal.

The selected carrier frequency and alternating phases cause the additional luminance signal to cancel out temporally and spatially in the same manner as the chrominance signal. The additional luminance signal ideally averages to zero, but in reality the signal averages to zero only if it is unchanging over time. Thus, the additional luminance signal will completely cancel only if it is unchanging. In signal processing terms, only common mode signals are completely canceled. Differential signals do not cancel each other out and will remain in the NTSC signal as a residual signal that may cause interference with the luminance signal. The amount of residual signal depends on the bandwidth of the additional luminance signal and the correlation of the additional luminance signal with the NTSC standard luminance signal. The greater the bandwidth of the additional luminance signal, the greater the amount of additional luminance signal that will feed through and become visible to the television viewer (in the form of interference). In addition, the less correlation between the additional luminance signal and the NTSC standard luminance signal, the greater the amount of additional luminance signal that will feed through and become visible to the television viewer in the form of interference.

The selection of a 30 Hz square wave as a modulation source creates additional problems not solved by the system described in the U.S. Pat. No. 4,660,072. Because an ideal square wave contains an infinite number of odd harmonics, the additional luminance signal is modulated not only at 30 Hz, but at all odd harmonics of these two signals as well. The modulation by many multiple frequencies increases the possibility that the additional luminance signal will overlap in the frequency domain with the video signal. The overlap with the video signal may not present a significant problem in the application described in the patent because the additional luminance signal is highly correlated with the NTSC standard luminance signal, so the interference may not be noticed by the viewer.

However, if the additional information signal added to the standard video signal is unrelated to the video signal, the approach disclosed in U.S. Pat. No. 4,660,072 may be unsuitable because the interference with the video signal may be intolerable. Furthermore, there may be unacceptable interference for the additional information signal itself. To avoid interference, it is necessary to reduce the bandwidth of the additional information signal. There is theoretically a 1.8 MHz bandwidth available in the unused portion of the chrominance spectrum. Because standard modulation creates two sidebands, the actual data bandwidth is limited to 0.9 MHz. The modulation technique proposed in U.S. Pat. No. 4,660,072 causes an unacceptable spectral spreading of the additional information signal that can cause interference with normal television operation.

Therefore, it can be appreciated that there is a significant need for a system and method for introducing an additional information signal into a video signal without the undesirable effects of signal interference or reducing bandwidth to avoid interference.

SUMMARY OF THE INVENTION

The invention is embodied in a system for inserting a data signal into a video signal. The system comprises a first filter which receives the data signal and produces a filtered signal having filter characteristics that permit the insertion of the filtered signal into an unused portion of the spectrum of the video signal. Modulator elements modulate a carrier frequency with the filtered signal to produce a modulated filtered signal. The carrier frequency is selected to permit the insertion of the filtered signal into the unused portion of the spectrum of the video signal to produce a modified video signal containing the modulated filtered signal with the filtered signal inserted into the unused portion of the spectrum of the video signal. A signal separator in a receiver portion separates the filtered signal from the modified video signal and a second filter receives the filtered signal from the signal separator and recovers the data signal from the filtered signal.

In one embodiment, the first filter is a comb filter with at least two taps. The comb filter comprises a delay circuit which delays the data signal by a predetermined period of time and an adder to add the data signal with the delayed data signal to produce the filtered signal. The delay circuit may be a first-in, first-out buffer, or an analog delay line. The predetermined period of time used by the delay circuit is 1/60th of a second such that the filtered signal contains substantially uniform spectral peaks with the 60 Hz spacing.

In an alternative embodiment, the first filter is a data buffer containing at least a portion of the data signal with the filter signal being generated by continuously replaying the data signal contained within the data buffer at a predetermined rate.

DETAILED DESCRIPTION OF THE INVENTION

The present invention resides in a system and method for introducing an additional information signal into an NTSC signal without a reduction in bandwidth. The additional information signal may be an analog data signal or a digital data signal. Whichever form the additional information signal may take, it will be referred to herein as a data signal.

As previously discussed, the technique disclosed in U.S. Pat. No. 4,660,072 modulates the incoming data signal with the 3.579545 MHz carrier signal that switches the phase of the carrier signal at a 30 Hz rate. The method described therein requires that data be frame periodic so that the inserted data signal does not become visible to the viewer in the form of interference. That is, the inserted data signal must repeat itself each frame, but with opposite phase so that the data cancels out, making the inserted data signal invisible to the viewer. Unfortunately, this means that the effective bandwidth is reduced to one-half the theoretical bandwidth because the data is repeated each frame. This approach also requires that a frame of data be stored in a buffer so that it can be inserted twice. A large buffer complicates the circuit design and increases the cost of the circuit.

The present invention inserts a data signal into the unused portion of the spectrum in a manner that does not require complex modulation of the data signal and which prevents the data signal from interfering with the video signal. The data signal is filtered and modulated by a simple modulator so that the data signal can be directly inserted into the video signal.

Figure 1A:
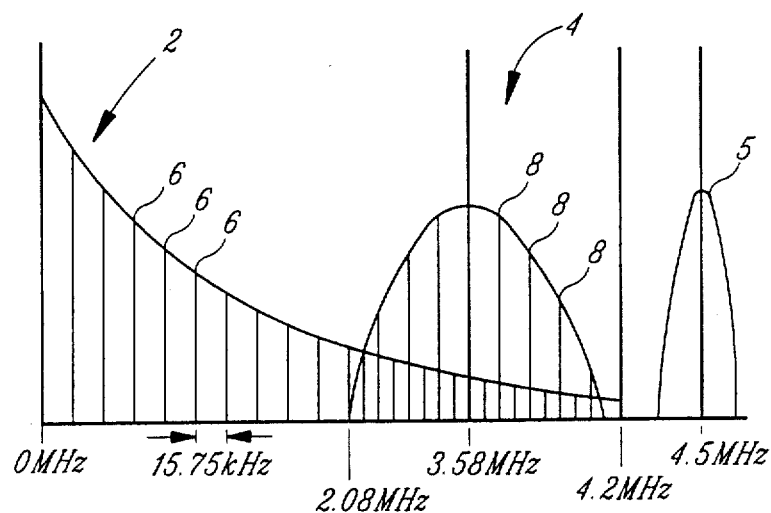
FIG. 1A depicts the spectrum of a standard NTSC signal according to the prior art.
Figure 1B:
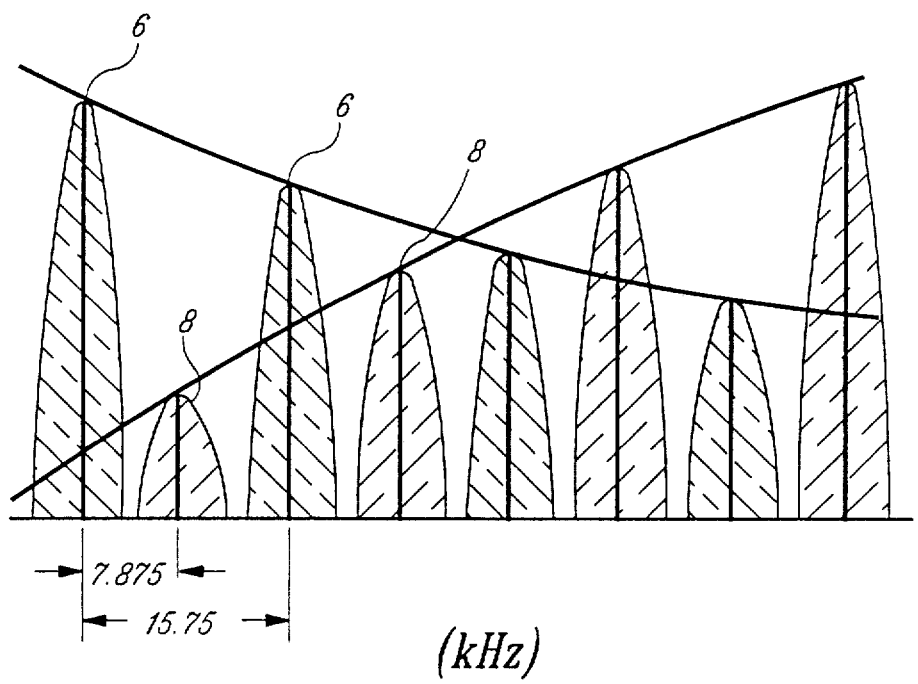
FIG. 1B is an enlarged view of a portion of the NTSC signal in FIG. 1A.
Figure 2:
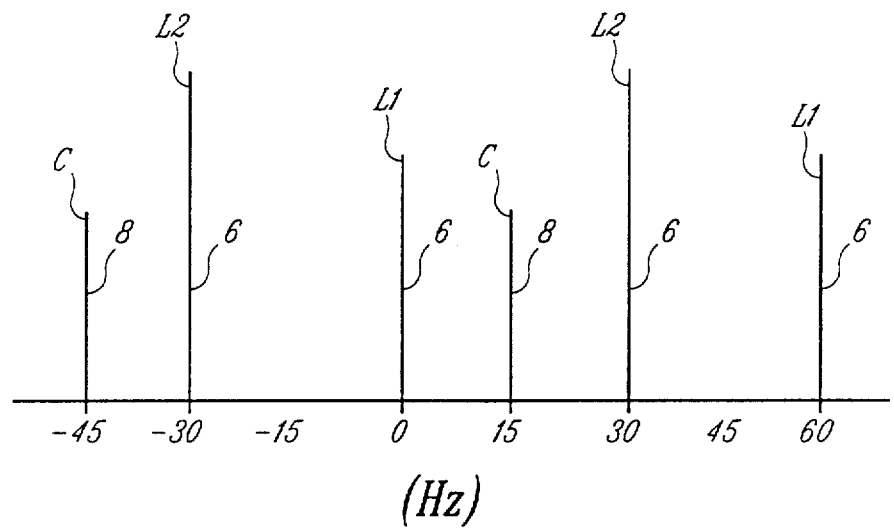
FIG. 2 depicts individual spectral lines in the NTSC signal of FIG. 1A.
Figure 3:
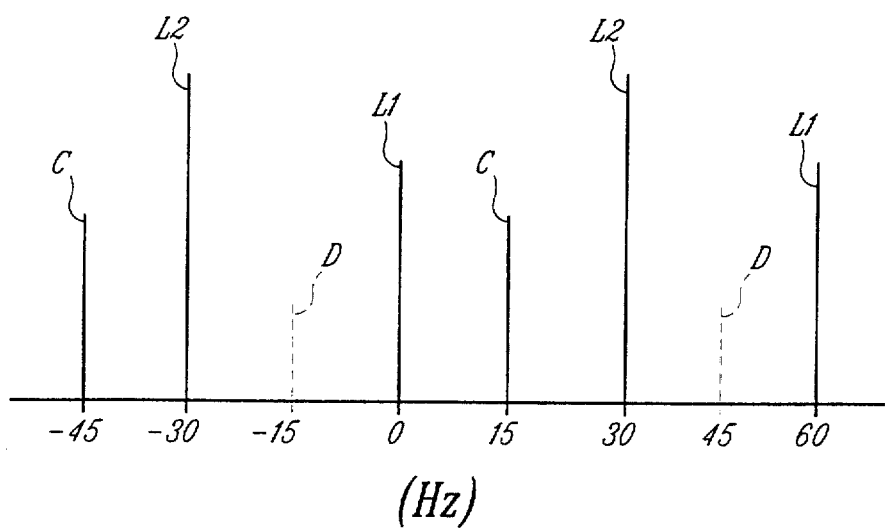
FIG. 3 depicts the introduction of an additional information signal into the NTSC signal of FIG. 2 according to the prior art.
Figure 4:
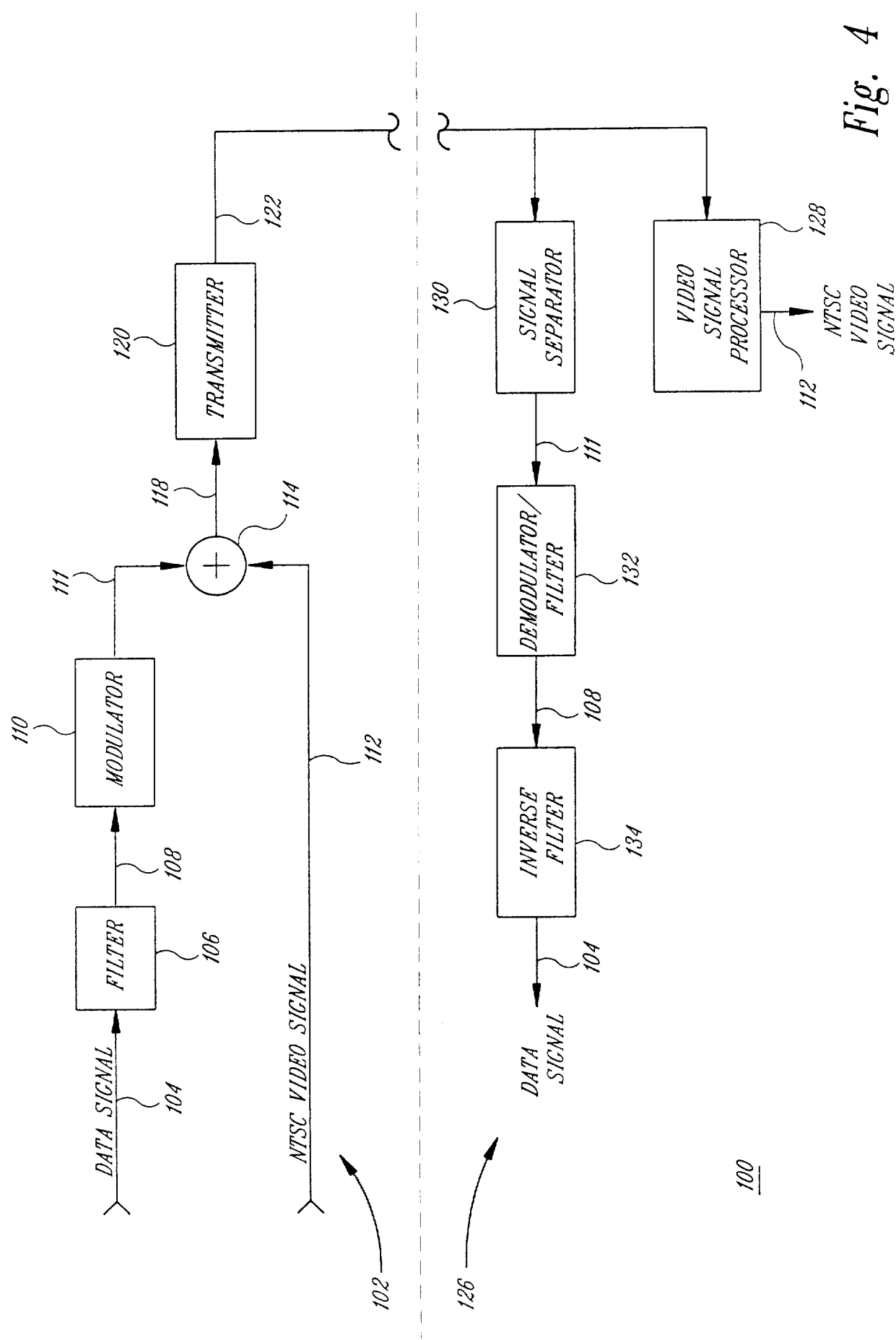
FIG. 4 is a functional block diagram of the system of the present invention.

The invention is embodied in a system 100 shown in functional block diagram form in FIG. 4. A transmitter portion 102 of the system 100 has a data signal 104 filtered by a filter 106 to generate a filtered data signal 108. Two embodiments of the filter 106 will be described in detail below. The filtered signal 108 is modulated by a simple modulator 110 to produce a modulated data signal 111. The modulated data signal 111 is added to a standard NTSC video signal 112 by an adder 114. The modulator 110 will be described in detail below. The filter 106 prevents the data signal 104 from causing interference in the NTSC video signal 112. The adder 114 is a conventional component that sums the modulated data signal 111 and the NTSC video signal 112 to generate a modified NTSC video signal 118 that contains both the NTSC video signal and the data signal 104 inserted into the unused portion of the spectrum (i.e., in the spectral holes previously discussed). The modified NTSC video signal 118 is transmitted by a transmitter 120. The output of the transmitter 120 is a transmitted signal 122. There are many well-known television transmitters that can be used satisfactorily with the system 100. The transmitter 120 may be a conventional television transmitter, a transmitter such as those used by conventional cable television companies, a signal generated by a video recorder or the like. Details of the transmitter 120 are not discussed herein. The actual type of transmitter 120 should not be considered a limitation of the system 100.

The type of transmitter 120 depends on the transmission medium in which the transmitted signal 122 is transmitted. The transmitted signal 122 may be any type of electromagnetic signals such as radio frequency signals, electrical signals on a wire cable, optical signals on a fiber-optic cable, signals on a magnetic media, or the like.

A receiver portion 126 of the system 100 contains a video signal processor 128 that receives the transmitted signal 122 and processes it to recover the NTSC video signal 112. The video signal processor 128 is a conventional television component and is not discussed herein. The data signal 104 has been previously added to the NTSC video signal 112 in a manner that causes the video signal processor 128 to cancel the data signal 104 from the NTSC video signal 112 as is known in the prior art. Thus, the output of the video signal processor 128 is the standard NTSC video signal 112 with little or no interference caused by the data signal 104. The NTSC video signal 112 is then processed as a normal video signal without the data signal 104.

A signal separator 130 in the receiver portion 126 also receives the transmitted signal 122 and separates the modulated data signal 111 from the transmitted signal. The signal separator 130 uses conventional television chrominance signal processing components to separate the modulated data signal 111 from the transmitted signal 122. The details of the signal separator 130 are well known by those of ordinary skill in the art and will not be discussed in detail herein. Details of other television circuit elements such as a tuner are also omitted for brevity.

The modulated data signal 111 is demodulated by a demodulator/filter 132 to recover the filtered signal 108. The demodulator/filter 132 will be discussed in detail below. The filtered signal 108 is processed by an inverse filter 134 to recover the original data signal 104. The inverse filter 134 may be a 60 Hz comb filter that is applied to the filtered signal 108.

The data signal 104 may be an analog signal or a digital data signal, such as would be useful for the transmission of digital music, database information, computer subscriber data, or the like. The subsequent processing of the data signal 104 in the receiver portion 126 depends on the particular form of the data signal (i.e., analog or digital), and the particular application for which the data signal is intended (e.g., digital music).

RECIRCULATING BUFFER

Figure 5:
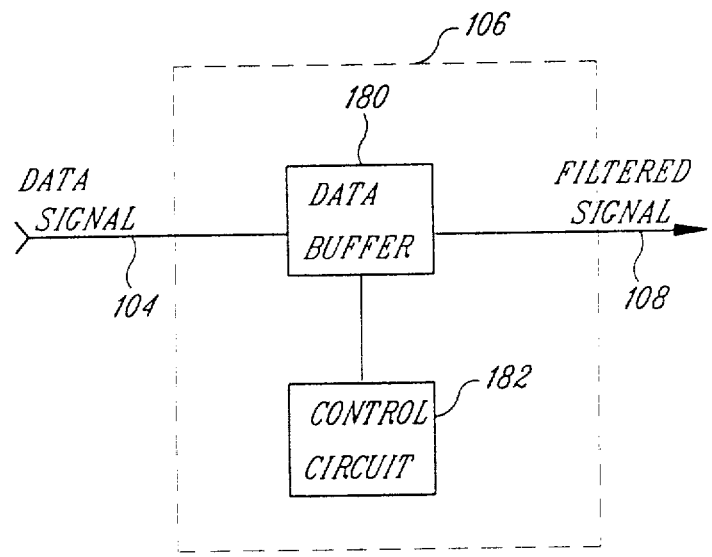
FIG. 5 illustrates a data buffer filter implementation of the system of FIG. 4.

In one embodiment of the invention shown in FIG. 5, the filter 106 is implemented using a data buffer 180. The data buffer 180 stores at least a part of the data signal 104 and continuously plays out the data at a predetermined periodic rate. According to one aspect of the well-known Parseval's theorem, no energy will exist in the spectrum except at integer multiples of the periodic rate. In the present embodiment, the data buffer 180 is 1/60 second in length and is played back continuously at a 60 Hz rate. This results in a line spectrum, similar to the comb filter, with 60 Hz spacing in the spectral peaks. Obviously, other buffer sizes and predetermined periodic rates could be readily used with the system 100. For example, a 1/30 second buffer played out at a rate of 120 Hz will provide compatible spectral spacing of 120 Hz. The output of the data buffer 180 is the filtered signal 108. The filter signal 108 is coupled to the modulator 110, and the remainder of the transmitter portion 102 (see FIG. 4) operates in an identical manner as described above.

The same data within the data buffer 180 is repeated in order to create the line spectrum with the 60 Hz spacing. However, the data buffer 180 must also be updated so that a continuous stream of data is inserted into the NTSC video signal 112. In the present embodiment, a control circuit 182 controls the rate at which the data is changed within the data buffer 180. The data within the data buffer 180 is changed after each 2 to 4 repetitions in which the data is repeated by the data buffer 180. This repetition of the data has the effect of reducing the bandwidth of the data signal 104, but the circuitry to implement the filter 106 is relatively simple and the temporal cancellation is greater thus reducing the visibility of the data signal within the NTSC video signal. For example, the data within the data buffer 180 may be divided into four subsets, designated herein as subsets a through d. The data buffer 180 initially plays out all four subsets a through d. While cycles b–d are being played out, the control circuit 182 causes subset a in the data buffer 180 to be replaced with new data. The next time the data buffer 180 plays out the subsets a–d, with subset a containing the updated data. During this repetition, the control circuit 182 replaces subset b with new data. The buffer 180 continuously plays out the subsets a–d, and the control circuit 182 replaces one subset with new data during each repetition. Thus, the one fourth of the data within the data buffer 180 is replaced each time that the data buffer repeats. Alternatively, the data buffer 180 could be slowly changed each time it is repeated so that the data is completely changed every 2 to 4 times that the data is repeated by the data buffer 180.

COMB FILTER

The filter 106 may comprise any number of well-known embodiments. An alternative embodiment of the filter 106 is a comb filter, shown in FIG. 6, where the data signal 104 is added to a delayed version of itself to create the same effect in the spectrum of the signal as the recirculating buffer discussed above. One advantage of the comb filter is that it does not require that the data signal be frame periodic to prevent the data signal from interfering with the video signal. A delay line 140 receives the data signal 104 and provides a predetermined delay, $\Delta t$, to produce a delayed data signal 142. The delay line may be a first-in, first-out buffer, an analog delay line, or the like. The delayed data signal 142 and the data signal 104 are added together by an adder 144 to produce the filtered signal 108.

Figure 6:
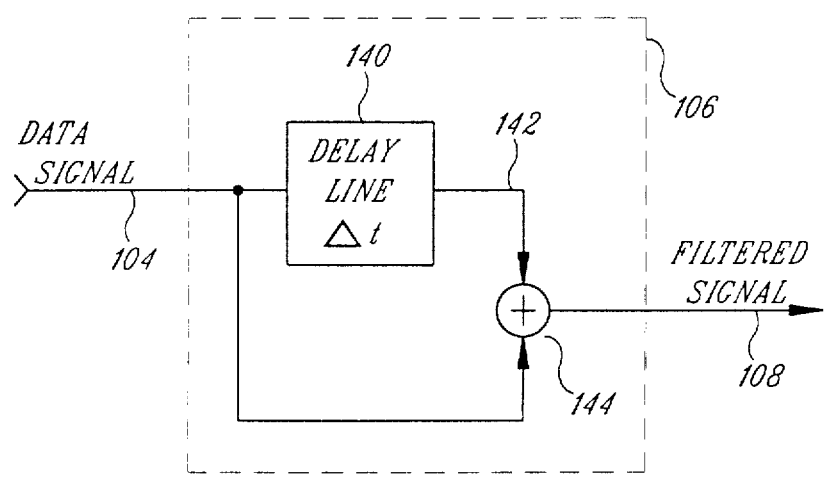
FIG. 6 illustrates an alternative comb filter implementation of the system of FIG. 4.
Figure 7A:
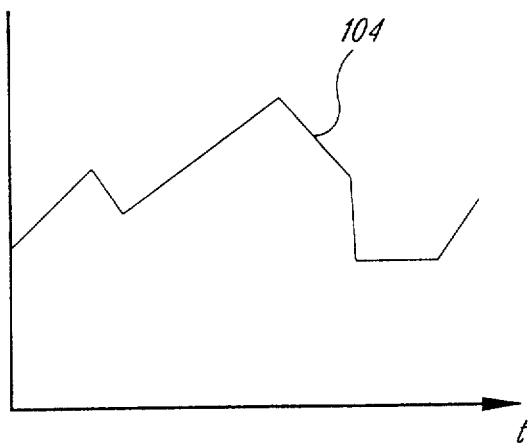
FIG. 7A depicts a typical waveform input to the comb filter of FIG. 6.
Figure 7B:
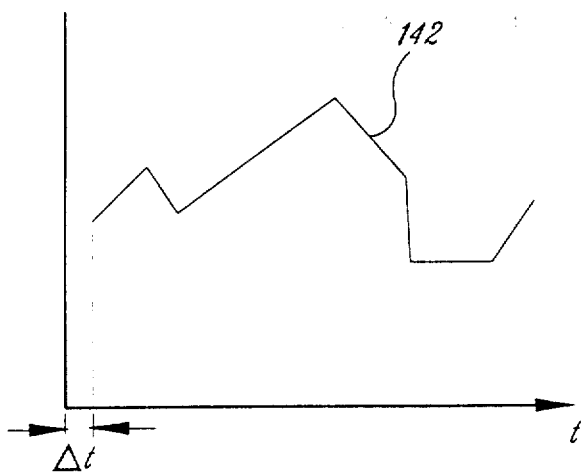
FIG. 7B depicts the waveform of FIG. 7A after passing through the delay line of the comb filter of FIG. 6.
Figure 7C:
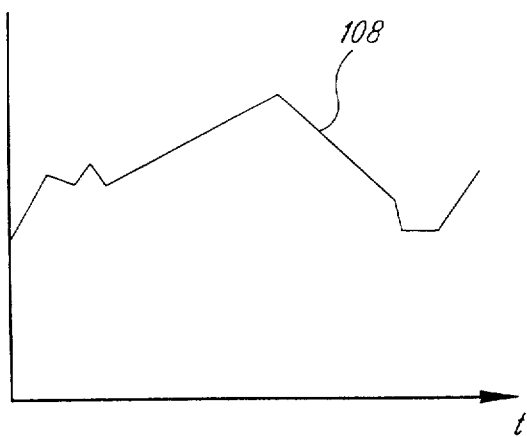
FIG. 7C depicts the filtered output from the comb filter of FIG. 6.

FIGS. 7A through 7C illustrate the comb filter process using the filter 106 of FIG. 6 in the time domain. The data signal 104 is shown in FIG. 7A and the delayed data signal 142 is shown in FIG. 7B. The sum of the data signal 104 and the delayed data signal 142, which produces the filtered signal 108, is shown in FIG. 7C.

Figure 7D:
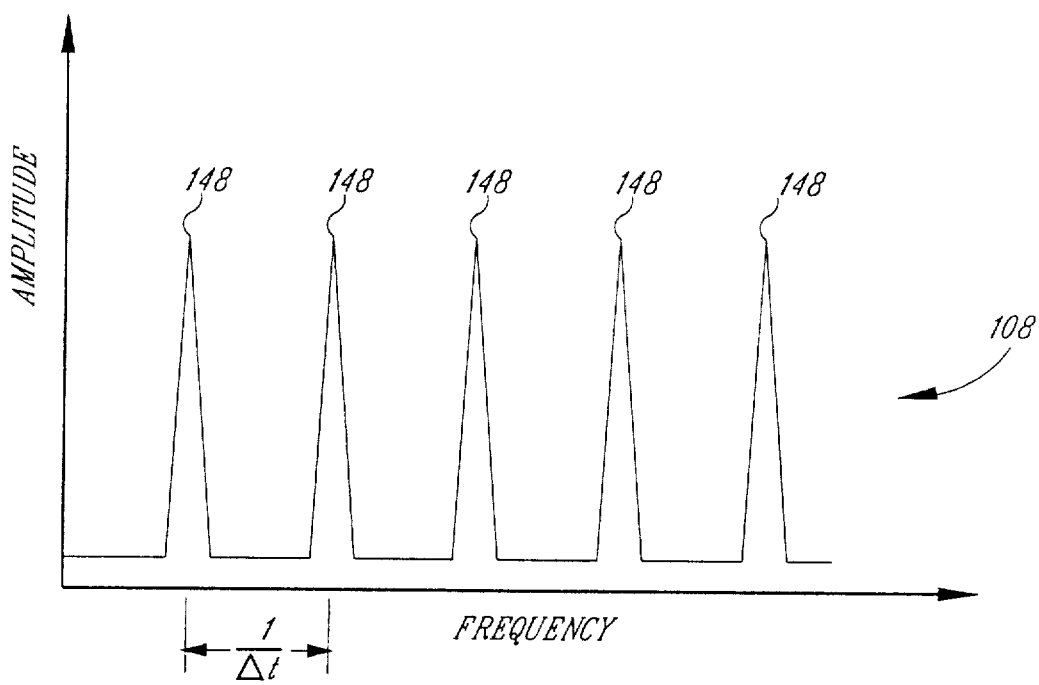
FIG. 7D depicts the spectrum of the comb filter of FIG. 6.

The filtered signal 108 is shown in the frequency domain in FIG. 7D. The spacing, $1/\Delta t$, between peaks 148 of the spectrum of the filtered signal 108 is determined by the delay time of the delay line 140. In this particular example, the delay time is 1/60 of a second which causes the peaks 148 to have a 60 Hz spacing. This spacing permits the filtered signal 108 to fit precisely in the unused portion of the spectrum between the luminance signal peaks where the chrominance signal peaks are not present. The filter 106 embodiment of FIG. 6 is a two-tap comb filter. Obviously, comb filters with more than two taps may also be employed. The more taps that are used in the comb filter, the more narrow the spectral peaks 148 (see FIG. 7D) and the greater the attenuation of the signal in the filter stop band between the spectral peaks 148. Other filters producing similar spectral characteristics may also be employed with the system 100.

Figure 7E:
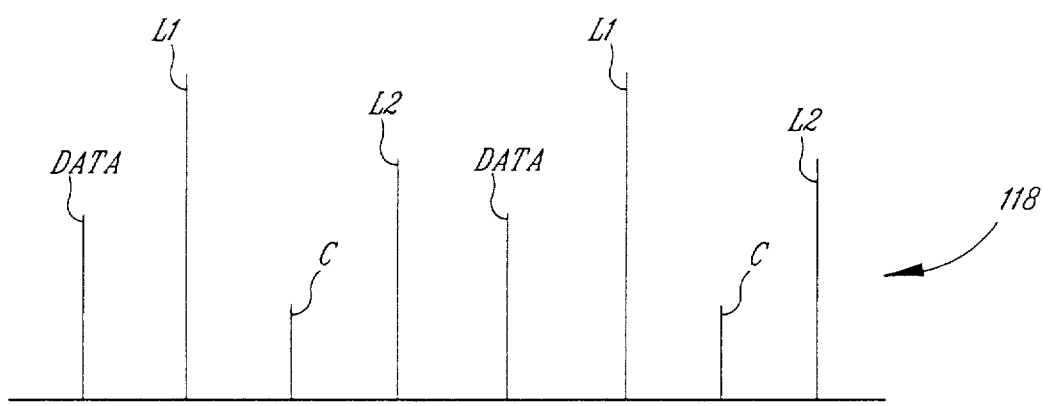
FIG. 7E depicts the spectrum of an NTSC signal with the insertion of the filtered output signal of FIG. 7C.

Referring again to FIG. 4, the modulator 110 is a simple modulator that receives the filter signal 108 and modulates it to fit into the unused portion of the spectrum previously discussed (i.e., the spectral holes). The modulator 110 can use any carrier frequency of 3.58 MHz±k*60 Hz+30 Hz, where k is any integer between 0 and approximately 18,000, which permits the filtered signal 108 to fit in the unused portion of the NTSC video signal 112. The upper limit for the integer, k, is selected so that the bandwidth of the data signal 104 is contained within the bandwidth (approximately ±1 MHz from the chrominance carrier) of the chrominance signal. It should be noted that these suggested modulation frequencies are selected to be centered within the unused portion of the spectrum. Obviously, other frequencies could also be used satisfactorily. By using a single carrier frequency for the modulator, the system 100 avoids the problem of the data signal spreading into a portion of the spectrum already occupied by the chrominance and luminance signals as occurs in the prior art. The spectrum of the signal generated by a single carrier frequency is well defined and allows the data signal 104 to be inserted into the unused portion of the spectrum without overlapping the signals already in the NTSC video signal 112. The output of the modulator 110 is the modulated data signal 111, which is added to the standard NTSC video signal 112 by the adder 114, as previously discussed. The output of the adder 114 is the modified NTSC video signal 118 that contains the NTSC video signal 112 with the data signal 104 inserted into the unused portion of the spectrum (i.e., in the spectral holes). The spectrum of the NTSC video signal with the filtered signal 108 inserted is shown in FIG. 7E.

The modified NTSC video signal 118 is transmitted by the transmitter 120 in any well-known manner to the receiver portion 126, such as by cable. The receiver portion 126 receives the transmitted signal 122 and recovers the data signal 104. The video signal processor 128 is a conventional television circuit that processes the video signal in the transmitted signal 122 and ignores the modulated data signal 111 that is also present in the transmitted signal 122. The signal separator 130 is a standard television component that processes the transmitted signal 122 and separates the modulated data signal 111 from the transmitted signal 122. In the presently preferred embodiment, the signal separator 130 is a bandpass filter centered about the chrominance carrier (3.58 MHz). The output of the signal separator 130 is the modulated data signal 111.

The demodulator/filter 132 is also a conventional television component that uses the same carrier frequency selected for the modulator 110. The modulated data signal 111 from the signal separator 130 is coupled to the demodulator/filter 132. The demodulator/filter 132 modulates the signal to generate the filtered data signal 108 centered at 0 Hz as well as an identical image centered at twice the selected carrier frequency. The selected carrier frequency and the identical image centered at twice the selected carrier frequency are removed by well-known lowpass filtering techniques. The output of the demodulator/filter 132 is the filtered signal 108 centered at 0 Hz. The filtered signal 108 contains the data signal 104, but in filtered form. The data signal 104 is recovered in the receiver portion 126 using the inverse filter 134.

Figure 8:
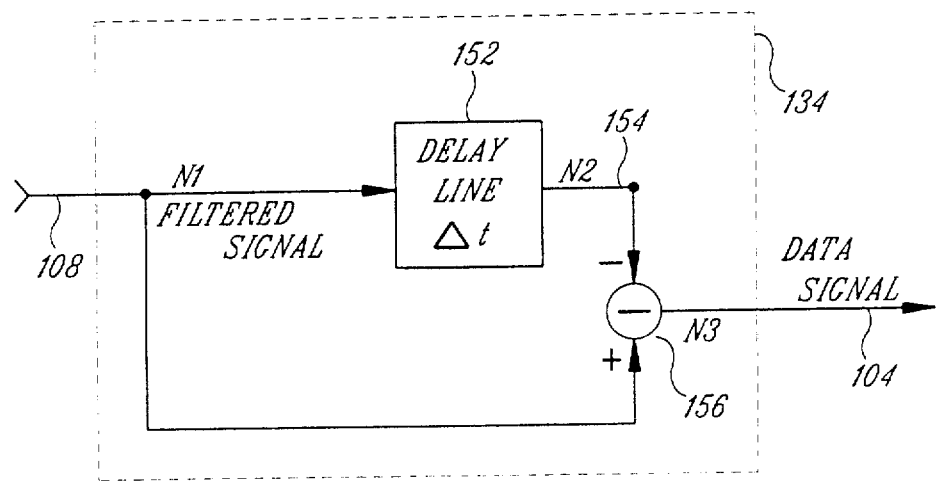
FIG. 8 illustrates an example of an inverse comb filter used by the system of FIG. 4 to reconstruct the data signal.

The data signal 104 can be recovered from the filtered signal 108 by the use of simple mathematical manipulation well known to those of ordinary skill in the art. If the filter 106 is the comb filter of FIG. 6, the inverse filter 134 is also a 60 Hz comb filter. An example of the inverse filter 134 is shown in FIG. 8 where the filtered signal 108 is designated as N1. A delay line 152 receives the filtered signal, N1, and provides the predetermined delay, $\Delta t$, to produce a delayed filtered signal 154, which is designated as N2. The delayed filtered data signal 154 (N2) is subtracted from the filtered signal 108 (N1) by a subtractor 156 to provide a subtracted data signal 158, which is designated as N3. The output of the subtractor 156 is the data signal 104. Other embodiments of the inverse filter 134 are well known in the art and will not be described herein.

Thus, the original data signal 104 can be filtered, modulated and inserted into a standard video signal. The inserted data signal is transmitted along with the video signal. The inserted data signal is demodulated and inverse filtered to recover the original data signal. The data is processed by the transmitter portion 102 and the receiver portion 126 in a manner that does not interfere with the video signal or the normal video signal processing.

The above example is appropriate for a standard NTSC video signal for use with a 60 Hz television system. It will be obvious to those skilled in the art that the principles of the present invention can be applied to both analog and digital data signals, and may also be applied to video standards other than the NTSC system described herein. For example, the principles of the present invention are equally applicable to standard video signals such as a Phase Alternating Line (PAL) video signal used in Europe with a 50 Hz television transmission system. The delay line 140 may be implemented for both analog and digital forms of the data signal 104. If the data signal 104 is a digital signal, the delay line 140 may be a first-in-first-out shift register that provides the appropriate delay.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A system for transmitting a data signal with a video signal, comprising:

a first delay element receiving the data signal, the data signal being unrelated to the video signal, and producing a delayed data signal that is delayed a predetermined period of time from the data signal;

a first adder element adding the data signal and said delayed data signal to produce a first filtered signal having a plurality of spectral peaks with a spacing corresponding to spacing in an unused portion of the frequency spectrum of the video signal;

a modulator modulating a single unmodulated carder frequency with said first filtered signal to produce a modulated filtered signal, said carder frequency being selected to permit said first filtered signal to be inserted into said unused portion of the frequency spectrum of the video signal;

a second adder element adding said modulated filtered signal and the video signal to produce a modified video signal containing said modulated filtered signal with said first filtered signal inserted into said unused portion of the frequency spectrum of the video signal;

a transmitter transmitting said modified video signal;

a receiver receiving said transmitted modified video signal and processing said modified video signal to regenerate the video signal;

a separator circuit separating said modulated filtered signal from said transmitted modified video signal to reconstruct said first filtered signal; and an inverse filter processing said reconstructed first filtered signal to recover the data signal, whereby the data signal is transmitted with the video signal and subsequently separated from the data signal in said receiver.

2. The system of claim 1 wherein said predetermined period is 1/60 second.

3. The system of claim 1 wherein said carrier frequency is selected to position said plurality of spectral peaks substantially in the center of said unused portion of the spectrum of the video signal.

4. The system of claim 1 wherein said carrier frequency is 3.579545 MHz±k*60 Hz+30 Hz, where k is an integer having a value between 0 and 18,000.

5. The system of claim 1 wherein said carrier frequency is 3.579545 MHz±30 Hz.

6. A system for transmitting a data signal with a video signal, comprising:

a first filter receiving the data signal and producing a filtered signal having a plurality of spectral peaks with spacing corresponding to spacing of an unused portion of the frequency spectrum of the video signal, said data signal being unrelated to the video signal;

a modulator element modulating a single unmodulated carrier frequency with said filtered signal to produce a modulated filtered signal, said carrier frequency being selected to modulate said filtered signal into said unused portion of the frequency spectrum of the video signal to produce a modified video signal containing said modulated filtered signal with said filtered signal inserted into said unused portion of the frequency spectrum of the video signal;

a signal separator processing said modified video signal to recover said filtered signal; and a second filter receiving said recovered filtered signal from said signal separator to recover the data signal from said recovered filtered signal, whereby the data signal is inserted into said unused portion of the frequency spectrum of the video signal and subsequently recovered from the video signal.

7. The system of claim 6 wherein said first filter is a comb filter.

8. The system of claim 7 wherein said comb filter has at least two taps.

9. The system of claim 7 wherein said comb filter comprises a delay circuit delaying the data signal by a predetermined period of time to produce a delayed data signal, and an adder element adding the data signal and said delayed data signal to produce said filtered signal.

10. The system of claim 9 wherein said delay circuit is a first-in-first-out buffer.

11. The system of claim 9 wherein said delay circuit is an analog delay line.

12. The system of claim 9 wherein said predetermined period of time is 1/60 second, such that said plurality of spectral peaks have a 60 Hertz spacing.

13. The system of claim 9 wherein said predetermined period of time corresponds the spectral spacing of said unused portion of the spectrum of the video signal.

14. The system of claim 6 wherein said first filter is a data buffer containing at least a portion of the data signal, said filtered signal being generated by continuously repeating the data signal contained within said data buffer at a predetermined rate.

15. The system of claim 14 wherein said data buffer stores 1/60 second of the data signal, and said predetermined rate is 60 Hertz, whereby said plurality of spectral peaks have a 60 Hertz spacing.

16. The system of claim 14 wherein said predetermined rate is selected such that said data buffer repeats the data signal contained within said data buffer every 1/60 second, whereby said plurality of spectral peaks have a 60 Hertz spacing.

17. A system for inserting a data signal into a video signal, comprising:

a filter receiving the data signal and producing a filtered signal having a plurality of spectral peaks with spacing corresponding to spacing in an unused portion of the frequency spectrum of the video signal, said data signal being uncorrelated to the video signal; and a modulator element modulating a single unmodulated carrier frequency having a predetermined phase with said filtered signal to produce a modulated filtered signal, said carrier frequency being selected to modulate said filtered signal into said unused portion of the frequency spectrum of the video signal to produce a modified video signal containing said modulated filtered signal with said filtered signal inserted into said unused portion of the frequency spectrum of the video signal.

18. The system of claim 17 wherein said filter is a comb filter.

19. The system of claim 18 wherein said comb filter contains at least two taps.

20. The system of claim 18 wherein said comb filter comprises a delay circuit delaying the data signal by a predetermined period of time to produce a delayed data signal, and an adder element adding the data signal and said delayed data signal to produce said filtered signal.

21. The system of claim 20 wherein said delay circuit is a first-in-first-out buffer.

22. The system of claim 20 wherein said delay circuit is an analog delay line.

23. The system of claim 20 wherein said predetermined period of time is 1/60 second, such that said plurality of spectral peaks have a 60 Hertz spacing.

24. The system of claim 17 wherein said filter is a data buffer containing at least a portion of the data signal, said filtered signal being generated by continuously repeating said portion of the data signal contained within said data buffer at a predetermined rate.

25. The system of claim 24 wherein said data buffer stores 1/60 second of the data signal, and said predetermined rate is 60 Hertz, whereby said plurality of spectral peaks have a 60 Hertz spacing.

26. The system of claim 24 wherein said predetermined rate is selected such that said data buffer repeats the data signal contained within said data buffer every 1/60 second, whereby said plurality of spectral peaks have a 60 Hertz spacing.

27. A system for recovering a data signal inserted into an unused portion of the frequency spectrum of an unrelated video signal, the data signal being filtered to generate a filtered signal having a plurality of spectral peaks with a spacing corresponding to spacing in an unused portion of the frequency spectrum of the video signal and modulated with a single unmodulated carrier frequency to generate a modulated data signal, the system comprising:

a signal separator separating the modulated data signal from the unused portion of the frequency spectrum of the video signal;

a demodulator coupled to said signal separator and demodulating the modulated data signal to recover the filtered signal, said demodulator having a single carrier frequency with a predetermined phase and a carrier frequency selected to correspond to the unused portion of the frequency spectrum of the video signal; and a receiver filter receiving said filtered signal from said demodulator to recover the data signal from the filtered signal, said recovered data signal being uncorrelated to the video signal, whereby the data signal is inserted into the unused portion of the frequency spectrum of the video signal and subsequently recovered from the video signal.

28. The system of claim 27 wherein the data signal is filtered by a comb filter before being modulated, said receiver filter comprising an inverse comb filter to recover the data signal.

29. The system of claim 28 wherein said inverse comb filter comprises:

a delay element receiving said filtered signal from said demodulator and producing a delayed filtered signal that is delayed a predetermined period of time; and a subtractor subtracting said delayed filtered signal from said filtered signal to recover the data signal, whereby the data signal is transmitted with the video signal and subsequently separated from the data signal.

30. The system of claim 29 where said predetermined period of time corresponds to the spectral spacing of the unused portion of the spectrum of the video signal.

31. The system of claim 29 wherein said predetermined period of time is 1/60 second.

32. A method for transmitting a data signal with a video signal, comprising the steps of:

filtering the data signal to produce a filtered signal having a plurality of spectral peaks with spacing corresponding to spacing of an unused portion of the frequency spectrum of the video signal, the data signal being independent of the video signal;

modulating a single unmodulated carrier frequency with said filtered signal to produce a modulated filtered signal, said carrier frequency being selected to modulate said filtered signal into said unused portion of the frequency spectrum of the video signal to produce a modified video signal containing said modulated filtered signal with said filtered signal inserted into said unused portion of the frequency spectrum of the video signal;

separating said filtered signal from said modified video signal; and inverse filtering said filtered signal separated by said signal separator to recover the data signal from said filtered signal.

33. The method of claim 32 wherein said step of filtering uses a comb filter to produce said plurality of spectral peaks by delaying the data signal by a predetermined period of time corresponding to said plurality of spectral peaks to produce a delayed data signal, and adding said delayed data signal to the data signal.

34. The method of claim 32 wherein said step of filtering produces said plurality of spectral peaks having a 60 Hertz spacing.

35. The method of claim 32 wherein said wherein said step of filtering uses a data buffer containing at least a portion of the data signal, and said filtered signal is generated by continuously repeating said portion of the data signal contained within said data buffer at a predetermined rate.

36. The method of claim 35 wherein said predetermined rate is selected to correspond to the spectral spacing of said unused portion of the spectrum of the video signal.

37. The method of claim 35 wherein said predetermined rate is selected such that said data buffer repeats said portion of the data signal contained within said data buffer every 1/60 second, whereby said filtered signal contains substantially uniform spectral peaks with a 60 Hertz spacing.

38. A method for inserting a data signal into a video signal, comprising the steps of:

filtering the data signal to produce a filtered signal having a plurality of spectral peaks with spacing corresponding to spacing in an unused portion of the frequency spectrum of the video signal the data, signal being unrelated to the video signal; and modulating a single unmodulated carrier frequency having a predetermined phase with said filtered signal to produce a modulated filtered signal, said carrier frequency being selected to modulate said filtered signal into said unused portion of the frequency spectrum of the video signal to produce a modified video signal containing said modulated filtered signal with said filtered signal inserted into said unused portion of the frequency spectrum of the video signal.

39. The method of claim 38 wherein said step of filtering uses a comb filter to produce said plurality of spectral peaks by delaying the data signal by a predetermined period of time corresponding to said plurality of spectral peaks to produce a delayed data signal, and adding said delayed data signal to the data signal.

40. The method of claim 38 wherein said wherein said step of filtering uses a data buffer containing at least a portion of the data signal, and said filtered signal is generated by continuously repeating said portion of the data signal contained within said data buffer at a predetermined rate.

41. The method of claim 40 wherein said predetermined rate is selected to correspond to the spectral spacing of said unused portion of the spectrum of the video signal.

42. The method of claim 40 wherein said predetermined rate is selected such that said data buffer repeats said portion of the data signal contained within said data buffer every 1/60 second, whereby said plurality of spectral peaks have a 60 Hertz spacing.

43. A method for recovering a data signal inserted into an unused portion of the frequency spectrum of an unrelated video signal, the data signal being filtered to generate a filtered signal having a plurality of spectral peaks with a spacing corresponding to spacing in an unused portion of the frequency spectrum of the video signal and modulated with a single unmodulated carrier frequency to generate a modulated data signal, the method comprising the steps of:

separating the modulated data signal from the unused portion of the frequency spectrum of the video signal;

demodulating the modulated data signal separated from the unused portion of the spectrum of the video signal to recover the filtered signal, said step of demodulating using a single carrier frequency having a predetermined phase with said carrier frequency selected to correspond to said unused portion of the frequency spectrum of the video signal; and inverse filtering the filtered signal following said step of demodulating to recover the data signal from the filtered signal, said recovered data signal being uncorrelated to the video signal.

44. The method of claim 43 wherein the data signal is filtered by a comb filter before being modulated, said step of inverse filtering using an inverse comb filter to recover the data signal by delaying the filtered signal by a predetermined period of time corresponding to said plurality of spectral peaks to produce a delayed filtered signal, and adding said delayed filtered signal to said filtered signal to recover the data signal.

\* \* \* \* \*

UNITED STATES PATENT AND TRADEMARK OFFICE
CERTIFICATE OF CORRECTION

PATENT NO.    : 5,539,471
DATED         : July 23, 1996
INVENTOR(S)   : Nathan P. Myhrvold et al.

It is certified that error appears in the above identified patent and that said Letters Patent is hereby corrected as shown below:

In column 9, line 16, please delete "carder" and insert therefor --carrier--.

In column 9, line 18, please delete "carder" and insert therefor --carrier--.

In column 12, line 44, following "signal", please insert --,--.

In column 12, line 44, following "data", please delete ",".

Signed and Sealed this

Fifth Day of November, 1996

Attest:

BRUCE LEHMAN

*Attesting Officer*     *Commissioner of Patents and Trademarks*